(12) United States Patent
Breuer

(10) Patent No.: US 7,343,290 B2
(45) Date of Patent: Mar. 11, 2008

(54) SYSTEM AND METHOD OF SWITCHING BETWEEN DIALOG SYSTEMS WITH SEPARATE DEDICATED COMMUNICATION UNITS

(75) Inventor: Richard Breuer, Alsdorf (DE)

(73) Assignee: Nuance Communications, Inc., Burlington, MA (US)

(*) Notice: Subject to any disclaimer, the term of this patent is extended or adjusted under 35 U.S.C. 154(b) by 871 days.

(21) Appl. No.: 10/252,859

(22) Filed: Sep. 23, 2002

(65) Prior Publication Data
US 2003/0061052 A1 Mar. 27, 2003

(30) Foreign Application Priority Data
Sep. 26, 2001 (DE) ................ 101 47 549

(51) Int. Cl.
*G10L 21/00* (2006.01)
*G06F 17/28* (2006.01)
(52) U.S. Cl. .............. 704/270.1; 704/2; 704/277
(58) Field of Classification Search ........... 704/2, 704/270.1
See application file for complete search history.

(56) References Cited

U.S. PATENT DOCUMENTS

| 5,915,001 | A | * | 6/1999 | Uppaluru | 704/270.1 |
|---|---|---|---|---|---|
| 5,943,417 | A | | 8/1999 | Cox et al. | 379/266 |
| 6,396,920 | B1 | * | 5/2002 | Cox et al. | 379/266.02 |
| 6,807,574 | B1 | * | 10/2004 | Partovi et al. | 709/224 |
| 6,922,465 | B1 | * | 7/2005 | Howe | 379/76 |
| 7,010,610 | B1 | * | 3/2006 | Ringhof et al. | 709/232 |
| 7,082,392 | B1 | * | 7/2006 | Butler et al. | 704/233 |

FOREIGN PATENT DOCUMENTS

| EP | 0 611 135 A1 | 8/1994 |
|---|---|---|
| EP | 0 982 916 A2 | 3/2000 |
| WO | WO 95/20859 | 8/1995 |

* cited by examiner

*Primary Examiner*—Tālivaldis Ivars Šmits
(74) *Attorney, Agent, or Firm*—Bromberg & Sunstein LLP

(57) ABSTRACT

The invention concerns a method of switching from one original dialog system (1), which communicates with the user using its own dedicated speech recognition and/or speech output unit (6), to a target dialog system (2), which also communicates with the user using its own dedicated speech recognition and/or speech output unit (7), whereby the language of the speech recognition and/or speech output unit (7) of the target dialog system (2) can be set. The original dialog system (1) transfers a language information parameter ($P_2$) to the target dialog system (2), as a result of which the language which the original dialog system (1) used for communication with the user is specified. The target dialog system (2) uses this language information parameter ($P_2$) to set the language of the speech recognition and/or speech output unit (7) for further communication with the user.

8 Claims, 1 Drawing Sheet

SYSTEM AND METHOD OF SWITCHING BETWEEN DIALOG SYSTEMS WITH SEPARATE DEDICATED COMMUNICATION UNITS

The invention concerns a method of switching a user from an original dialog system which communicates with the user by means of a speech recognition and/or speech output unit to a target dialog system which also communicates with the user by means of a speech recognition and/or speech output unit. At least in the case of the target dialog system, the speech recognition and/or speech output unit can hereby be partially set to one of several languages. In addition, the invention concerns dialog systems for implementing this method.

Dialog systems that communicate with a user by means of speech recognition and/or speech output units have been known for some considerable time. These are speech-controlled, automatic systems, which are also frequently known as voice portals. Examples of these are automatic telephone answering and information systems, as used nowadays by some of the larger companies and organizations, for example, to provide callers as quickly and conveniently as possible with the required information, or connect them with someone who can deal with the caller's special requirements. Another example of this is an automated telephone information system, as already in use by some of the telephone companies.

These dialog systems may be dialog systems which communicate with the user solely via speech, i.e. all data and, where applicable, input-prompts to the user are output via a suitable speech output, e.g. via a TTS (Text To Speech) converter, or by playing back previously stored sound files. The user must also express himself verbally in order to input commands or data such as search terms etc. The commands or data are then recognized in a speech recognition unit so that the system can respond appropriately. The dialog systems may, however, also be mixed dialog systems which, for example, output the information only via a speech output unit but accept the inputting of commands by means of key strokes with which so-called DTMF (Dual Tone Multi Frequency) signals are generated in the case of conventional telephones, for example.

Automatic switching between the individual dialog systems is also possible. For example, a user of an automated telephone information system can have himself directly connected to the number of a particular subscriber found by the telephone information system. Should this be a company which uses a corresponding automated dialog system with speech recognition and/or speech output units, the user is then passed on from one automated dialog system to another automated dialog system. It can further be assumed that the next generation of dialog systems will even support the navigation of a caller from one dialog system to another through several successive connections. As the number of dialog systems in use increases, and with a further expansion of the network and the standardization of switching, a user will, therefore, in the future have the facility to start via one dialog system and have himself switched from this dialog system to other dialog systems at will. This is comparable with surfing the Internet today via hyperlinks. The individual dialog systems are, therefore, often also designated applications or voice or speech applications, as with the Internet. The terms are therefore also used synonymously in the following text.

Because more and more inexperienced users have access to such applications, correspondingly greater value must be attached to the easy, convenient use of these applications. This is all the more applicable in the case of dialog systems that operate via a telephone, since, owing to the familiarity of many consumers with the telephone, the user group will be even greater and will include even more inexperienced users than, for instance, the Internet. The applications will be supplied by the most varied manufacturers and providers, and installed in the most diverse countries and language areas, whereby the user may, in certain circumstances, not even know where the dialog system with which he is currently communicating is located. A critical situation for a user is a change in the language used from one dialog system to the next. A language change of this kind can cause confusion in the user and may even make further communication completely impossible. In principle, this problem also applies to Internet applications. In an acoustic application, however, the problem is even greater than in a visual one because no graphics are available for visual support. To prevent the user from having to communicate with the "target dialog system" to which he has been switched by the "original dialog system" in a language he does not understand, the user could immediately be prompted, as the first inquiry from the target dialog system, to input a required language. This could be done, for example, by the available languages being specified via the speech output unit, each with an associated key which the user must press to select the language in question. For example, the prompt "for English please press 1—für Deutsch drücken Sie bitte 2— . . . etc." could be output in this or in similar form, and the user then sets the correct language by pressing the appropriate key on the telephone. However, this has the disadvantage, firstly, that every time the user is directed from one dialog system to another, he must re-input the language. Secondly, considerable problems may arise if it is, for example, a dialog system in a completely foreign language zone, e.g. a dialog system in the Asiatic language zone for a European user. It is likely that a number of languages from the foreign language zone will first be offered, whereby the prompts will take place in the corresponding languages. In this event, the user may not even be in a position to understand that this is a menu item for setting the required language, and will in certain circumstances break off before a language he can understand is offered.

It is therefore an object of the invention to specify a switching method between dialog systems operating with speech recognition and/or speech output units, with which the user is directed conveniently and quickly from one dialog system to another, and the above-mentioned language problems are avoided.

According to the invention, a language information parameter is sent to the target dialog system during switching. This language information parameter indicates the language in which communication has taken place between the user and the original dialog system. The language information parameter is a signal which causes the target dialog system to set the speech recognition and/or speech output unit, for further communication with the user, to a suitable language, preferably the same language as that of the original dialog system. In other words, the first application called by a user defines the language. The information concerning the language used is then passed on to subsequent applications in order that every application uses the same language as the previous one. Should precisely the same language as that used by the user for communication with the original dialog system not be available in the target dialog system, a language which is most similar to the language used by the original dialog system or which a user who speaks the language specified by the language information parameter will be most likely to understand, is selected from the available languages. For example, if the user has communicated with the original application in "Swiss German" then "German" could be set in the target dialog system if "Swiss German" is not available there.

The setting of the language in the first application can take place in any manner desired. For example, the user could select a language in a corresponding menu item of the dialog. A further option is for the first application called to select a language using the telephone number of the caller and/or the country code. Combinations of the most diverse methods are also possible so that, for example, a system firstly begins with a language corresponding to the country code of the caller and then enables the caller either to retain this language or to select another one.

Should the first application be a so-called personalized service, such as a service administering a personal telephone book, the language used by the user can also—following corresponding setting at the user's service facility—be stored in a profile assigned to the user and transmitted according to the invention from there to further services.

The significant advantage of an automatic transfer of language information in this way from one dialog system to another consists in the fact that, without having to do anything further, the user can communicate with the current dialog system automatically, as far as possible, in the originally defined language or a similar language which the user understands. A "voicenet" comprising several dialog systems or language applications could therefore be browsed by a German in German, while an Englishman could browse the voicenet in English, and so on.

The method according to the invention can be implemented relatively simply and cost-effectively. All that is required is that the transmission of the language information parameter takes place in such a manner that the various dialog systems recognize and understand the language information parameter, i.e. a standardized transfer must take place, while the standard must be supported by the applications of the various manufacturers.

It is desirable for the transmission of the language information parameter to be embedded in a larger context which allows the transmission of further information from the original dialog system to the target dialog system. For instance, further parameters that characterize the user and/or the connection between the user and the original dialog system can be transmitted. This can include, for example, various items of login information, such as the telephone number of the user or of the set from which the user is calling, or the local time of the original dialog system.

It is particularly where several parameters are being transmitted that it is a good idea, when transmitting the language information parameter, for a code indicating that a language information parameter is being transmitted and/or in what form it is coded, to be sent to the target dialog system. In a preferred embodiment, a code of this kind is transmitted immediately before the language information parameter itself, so that the target dialog system immediately recognizes that a language information parameter in a certain form will then follow, and will method it accordingly. In the same way, the other parameters can also be coupled with code words indicating the parameter type. The various parameters can be transmitted together with the associated key codes in a joint data string from the original dialog system to the target dialog system.

A language symbol already standardized internationally is a possibility for use for the coding of the language information parameter. One option here is the use of the two-digit code for representation of the names of languages, as standardized in ISO 639. The registration authority for ISO 639 is Infoterm, Austrian Standardization Institute (ON), Vienna, Austria.

The fastest possible compatibility between the most diverse applications—with a simultaneously low input in the realization of the method—can be achieved if the language information parameter and, where applicable, the other parameters, are sent to the target dialog system within a communication protocol used for building the connection between the original dialog system and the target dialog system.

A communication protocol is generally a defined method routine, including the formats used, for how communication between stations remote from one another takes place in a transmission system. In a communication protocol of this kind for building connections, therefore, e.g. the different formats and the data exchange routine with which the various systems understand each other during building, such as the exchange of data for mutual identification and synchronization with each other (known as "handshakes"), are defined.

Differently defined protocols exist, depending on the nature of the connection, e.g. a telephone connection or a data connection on the Internet.

A relatively elegant variant here is the transmission of information using a telephony connection protocol which is used for building the telephone connection, e.g. the generally known ISDN connection protocol. In a protocol of this kind, the language information parameter and, where applicable, the other parameters could be dealt with similarly to the transfer of the caller's subscriber number which already takes place today. To this end, only minor changes are necessary within the existing telephony connection protocols.

Alternatively, it is also possible that—instead of being within a connection protocol—the language information parameter is transmitted within a communication protocol used for data transfer in the method of an already existing connection between the original dialog system and the target dialog system. These communication protocols depend on, inter alia, the programming language with which the applications involved are implemented and/or on which protocols are accepted by the particular programming languages.

In a further preferred example of embodiment, the communication protocol is what is known as an Internet protocol (also known as an IP), or a protocol based on the Internet protocol, e.g. the CGI (Common Gateway Interface) protocol or the RPC (Remote Procedure Call) protocol, both of which are used for data exchange during a connection. One further option is the use of the VOIP (Voice Over Internet Protocol), which is used to build the connection of an Internet connection and constitutes an alternative to the ISDN connection protocol.

The use of communication protocols of this kind has the advantage that some standards supported by the most diverse applications already exist. For example, the programming language Voice-XML (also known as VXML), which is structured similarly to HTML as used for programming Internet applications, and is already in use for building many language applications, offers the facility of starting a target dialog system via an active VXML page using the CGI protocol on a remote server. Parameters could be transferred to the target application with this CGI protocol. All that would be needed is to definitively establish the form and manner in which the language information parameter is transferred within the CGI protocol. However, the disadvantage of using the CGI protocol as compared with a telephony connection protocol resides in the restriction to the programming language used, i.e. to Voice-XML in this case.

A further option consists in the language information parameter and, where applicable, any other parameters to be transmitted being stored by the original dialog system in a temporary store of the communication network used. This may be any store within the network, e.g. a central server such as a web server, which can make available an appropriate facility or interface for storing the language information parameter and, where applicable, the other parameters.

The language information parameter can be recalled from there by a target dialog system, whereby it is also possible that the data will be converted within the temporary store, so that a transfer of data between incompatible dialog systems is also possible. For this to happen, only an address under which the target dialog system can retrieve the language information parameter need be transferred from the original dialog system to the target dialog system, or the location at which a dialog system will find data of this kind must be generally known. Alternatively, the facility in the network which is equipped with the temporary store can also in itself transmit the language information parameter in a suitable form to the target dialog system. In this case, the information concerning the target dialog system to which the language information parameter is to be passed must, of course, be transmitted to the network facility.

In order to execute the method according to the invention, on the one hand a dialog system with a speech recognition and/or speech output unit, which is equipped with a means of switching the user to a target dialog system, and which is also equipped with a means for transmitting a language information parameter to the target dialog system during the switching, is required. This may be a means that transmits the language information parameter as described either directly—e.g. using a suitable communication protocol—or indirectly via a temporary store arranged in the network.

On the other hand, a dialog system which communicates with the user using a speech recognition and/or speech output unit which can be set to one of several languages as desired, and which is equipped with a means for receiving the language information parameter, is required if a user is switched from one original dialog system to this dialog system. In addition, the dialog system must be equipped with a means of automatically selecting, using the transmitted language information parameter, a suitable language for the speech recognition and/or speech output unit in order that the further communication with the user is conducted in this language.

The invention will be further described with reference to examples of embodiment shown in the drawings, to which, however, the invention is not restricted.

Figure 1:
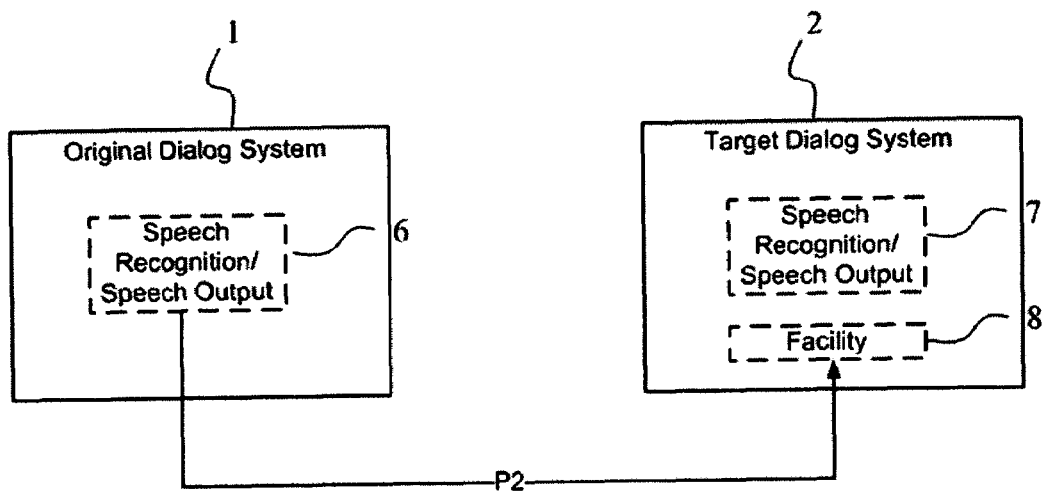
FIG. 1 shows a schematic diagram of the method according to the invention according to a first example of embodiment.

In the example of embodiment shown in FIG. 1, the first dialog system 1, which for simplification purposes is shown here as a block in precisely the same way as the second dialog system 2, is equipped with a speech recognition and/or speech output unit 6, via which the dialog system 1 communicates with the user (not shown) in a particular language.

Within the dialog between the user and dialog system 1, the necessity arises for dialog system 1, as the original dialog system 1, to switch the user to a second dialog system 2, the "target dialog system" 2. This target dialog system 2 is also equipped with a speech recognition and/or speech output unit 7. This is able to communicate with the user by means of various languages.

Dialog systems 1, 2 may be essentially conventionally structured dialog systems 1, 2, which are equipped with corresponding communication ports, e.g. telephone connections with which the user can connect with the dialog system 1, 2. Dialog systems 1, 2 and also the speech recognition and/or speech output units 6, 7, as parts of dialog systems 1,2, may hereby be, for the greater part, installed in terms of software on the servers as corresponding routines. Speech recognition and/or speech output units of this kind are sufficiently well known to the person skilled in the art. The speech output unit may be, for instance, a TTS (Text To Speech) system, which machine-translates into language any information occurring within the dialog system, e.g. search results or input prompts etc. However, it may also consist of pre-produced sound files which are called up appropriately by the system to be output to the particular user. The type of speech recognition and/or speech output unit used is irrelevant to the invention itself. The only thing of significance is that the option exists, at least in the case of the target dialog system 2, of selecting one out of several languages.

It is, of course, also possible that the target dialog system is also capable of communicating in several languages and a language can be selected. It also goes without saying that, in the case of further switching, the target dialog system 2 shown in FIG. 1 can itself also serve as an original dialog system in the case of switching to a further dialog system, or that the target dialog system 2 shown in FIG. 1 switches the user back to the initial original dialog system 1 and should be regarded as an original dialog system in respect of this back-switching, the initial original dialog system then constituting the target dialog system.

In the example shown in FIG. 1, the target dialog system 2 is also equipped according to the invention with a facility 8 with which the language of the speech recognition and/or speech output unit 7 is selected using a language information parameter transferred by the original dialog system 1. This can be implemented by a suitable circuit or by a software routine within the dialog system 2.

On switching of the user, a data string D is transferred from original dialog system 1 to target dialog system 2. This data string D contains, inter alia, the language information parameter $P_2$. This language information parameter $P_2$ is passed on within the target dialog system 2 to the facility 8, which recognizes, using language information parameter $P_2$, in which language the original dialog system 1 has communicated with the user. Accordingly, the speech recognition and/or speech output unit 7 is automatically set by the facility 8 to a suitable—preferably the same—language.

Figure 2:
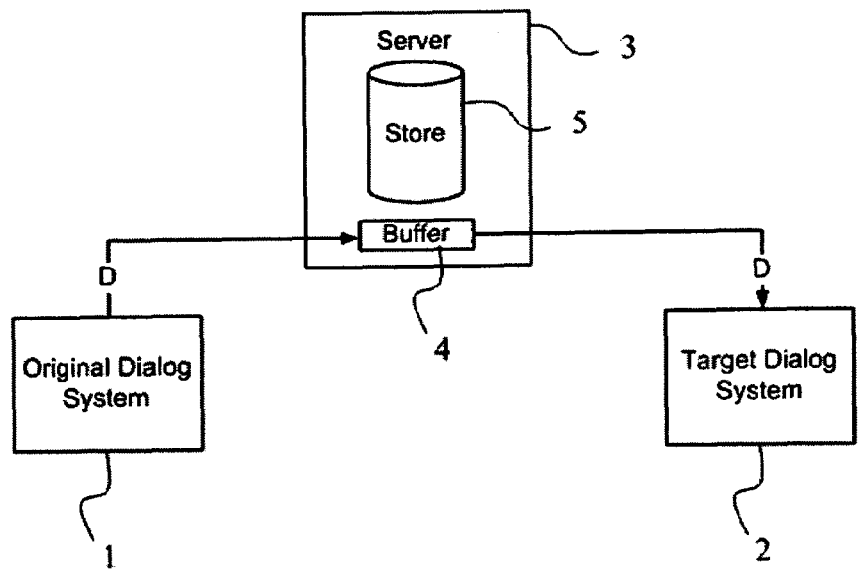
FIG. 2 shows a schematic diagram of the method according to the invention according to a second example of embodiment.

FIG. 2 shows an alternative example of embodiment in which the data string D is initially passed from the original dialog system 1 to a buffer store 4, which is located on a central server 3 within the communication network. From server 3, data string D is then passed on to target dialog system 2, or target dialog system 2 recalls the data from server 3. Server 3 also contains a store 5 in which further general data is stored, as well as a suitable facility, e.g. a software application, for outputting or passing on the data string sent from original dialog system 1 to the desired target dialog system 2. The server 3 can also be equipped in such a way that data string D is methodized in advance within server 3, e.g. converted from one format to another format, in order to enable an exchange of data between two incompatible dialog systems. The data necessary for this can be stored in e.g. the store 5.

Figure 3:
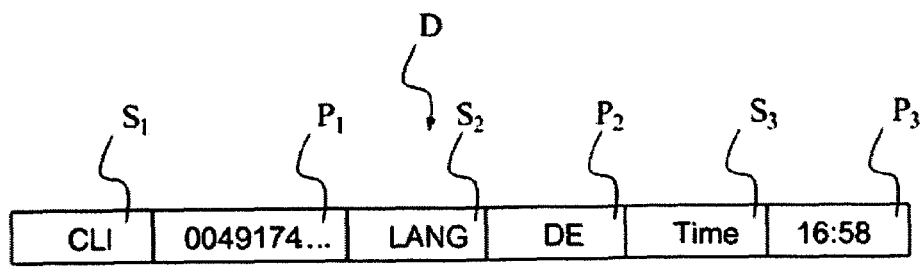
FIG. 3 shows a schematic diagram of a data string within which a language information parameter is transmitted from one dialog system to another dialog system.

FIG. 3 shows a typical example of embodiment of a data string D which is transmitted from original dialog system 1 to target dialog system 2. This data string D contains not just the language information parameter 2, but also further parameters $P_1$, $P_3$, which, if appropriate, can use the target dialog system 2 for the further dialog with the user.

Codes $S_1$, $S_2$, $S_3$ are arranged in front of the individual parameters $P_1$, $P_2$, $P_3$ within the data string, to define the type of the following parameters. A data string here consists of a sequence of defined code words and following values.

In the example of embodiment shown, the abbreviation "CLI" is located in the first position as the code, this being recognized by the recipient as "Calling Line ID". This means that, after the first code $S_1$, a telephone number $T_1$ of the current caller follows. Here, this telephone number $T_1$ also contains the general country code, so that the target dialog system 2 can recognize the country from which the user is calling. This is followed by the code "LANG", which, as an abbreviation for language, indicates that there will now follow the further parameter $P_2$ in the form of language information parameter $P_2$. In the example of embodiment shown in FIG. 3, the language information parameter $P_2$ is represented by the abbreviation "DE", which, according to ISO 639, means that the language used is German. According to this standard, the abbreviation for English is "EN", for French "FR", for Italian "IT" etc. Following language information parameter $P_2$ is the code "Time", $S_3$, which informs the target dialog system that the local time $P_3$ of the call of the initial application will be transmitted next.

This method does not just enable the transmission of the language information parameter and thereby a problem-free passage from one dialog system to another dialog system without language problems occurring for the user, but also allows further relevant information to be transferred which can be used by the target dialog system in turn to be of optimum service to the user. So, for example, the user's location can be determined through the transmission of the telephone number, and, according to this, country-specific, targeted information can be issued to the user.

The invention claimed is:

1. A method of switching a user from an original dialog system to a separate target dialog system which can be set as desired to one of a plurality of languages, each dialog system having its own dedicated communication unit for communicating with a user using at least one of automatic speech recognition and text-to-speech (TTS), the method comprising:

communicating to the target dialog system a language information parameter representing a language of an original dialog communication between the user and the original dialog system using a dedicated original dialog communication unit based on at least one of automatic speech recognition and text-to-speech (TTS), and, using the language information parameter for the target dialog system to automatically select a suitable language for communication with the user using a dedicated target dialog communication unit based on at least one of automatic speech recognition and text-to-speech (TTS).

2. A method according to claim 1, further comprising:

communicating to the target dialog system an additional original dialog parameter characterizing the original communication between the user and the original dialog system.

3. A method according to claim 1, wherein each dialog system includes its own dedicated speech recognition unit.

4. A method according to claim 1, wherein each dialog system includes its own dedicated Text To Speech (TTS) unit.

5. A dialog switching system comprising:

means for switching a user from an original dialog system to a separate target dialog system which can be set as desired to one of a plurality of languages, each dialog system having its own dedicated communication unit for communicating with a user using at least one automatic speech recognition and text-to-speech (TTS), including means for communicating a language information parameter to the target dialog system representing a language of an original dialog communication between the user and the original dialog system using a dedicated original dialog communication unit based on at least one of automatic speech recognition and text-to-speech (TTS); and means for selecting responsive to the language information parameter a target dialog language for use in a communication between the target dialog system the dialog user using a dedicated target dialog communication unit based on at least one of automatic speech recognition and text-to-speech (TTS).

6. A dialog system according to claim 5, further comprising:

means for communicating to the target dialog system an additional original dialog parameter characterizing the original communication between the user and the original dialog system.

7. A dialog system according to claim 5, wherein each dialog system includes its own dedicated speech recognition unit.

8. A dialog system according to claim 5, wherein each dialog system includes its own dedicated Text To Speech (TTS) unit.

* * * * *